United States Patent [19]
Shimizu et al.

[11] Patent Number: 5,198,243
[45] Date of Patent: Mar. 30, 1993

[54] CALENDERING ROLL CLEANING APPARATUS

[75] Inventors: Tatsuo Shimizu; Osamu Yamaura; Toshio Soneta; Takashi Aoya, all of Miyagi, Japan

[73] Assignee: Sony Corporation, Tokyo, Japan

[21] Appl. No.: 723,602

[22] Filed: Jul. 1, 1991

[30] Foreign Application Priority Data

Jul. 2, 1990 [JP] Japan .................. 2-175115
Apr. 19, 1991 [JP] Japan .................. 3-113830

[51] Int. Cl.$^5$ .................................. B29C 37/00
[52] U.S. Cl. .................... 425/230; 15/256.51; 15/256.53; 425/232
[58] Field of Search ............ 15/256.5, 256.51, 256.53; 425/225, 230, 232

[56] References Cited

U.S. PATENT DOCUMENTS

| | | | |
|---|---|---|---|
| 3,510,903 | 5/1970 | Stoever et al. | 15/256.5 |
| 3,526,457 | 10/1970 | Dimond et al. | 15/256.51 |
| 3,598,488 | 8/1971 | DiFrancesco et al. | 15/256.5 |
| 3,781,107 | 12/1973 | Ruhland | 15/256.53 |
| 4,110,035 | 8/1978 | Kamata | 15/256.51 |
| 4,757,763 | 7/1988 | MacPhee et al. | 15/256.51 |
| 4,920,880 | 5/1990 | Hara et al. | 15/256.51 |
| 4,953,252 | 9/1990 | Akisawa | 15/256.51 |

*Primary Examiner*—Jay H. Woo
*Assistant Examiner*—Scott Bushey
*Attorney, Agent, or Firm*—Hill, Steadman & Simpson

[57] ABSTRACT

A calendering roll cleaning apparatus having a cleaning tape for wiping the surface of a calendering roll and an elastic belt formed of an elastic material is disclosed. The cleaning tape is thrust by the elastic belt from the back side of the calendering roll into pressure contact with the calendering roll. The elastic belt is formed of silicon rubber and is formed with indentations at predetermined pitch on its surface contacting with the cleaning tape. The cleaning tape is constituted b a porous fibrous base material and an abrasive applied in stripes on the base material.

5 Claims, 6 Drawing Sheets

CALENDERING ROLL CLEANING APPARATUS

BACKGROUND OF THE INVENTION

1. Field of the Invention

This invention relates to a calendering roll cleaning apparatus which is employed in a calendering process for smoothing a magnetic layer of a magnetic tape, for example, in the course of the production of a magnetic tape, and a cleaning tape employed in the calendering roll cleaning apparatus.

2. Description of the Prior Art

In a coated type magnetic tape, after application of a magnetic paint on a non-magnetic substrate, a process known as calendering is carried out for smoothing the surface of a magnetic layer of the tape. In the calendering process, the magnetic tape is pinched between an elastic roll and a stainless steel calendering roll maintained at a higher temperature and having its surface machined to a mirror finish. While an increased pressure is maintained between the rolls, the rolls are rotated relative to each other to feed the tape to smooth the surface of the magnetic layer.

However, with the coated type magnetic tape, it may occur that the binder contained in the magnetic paint be dislodged and become affixed to the calendering roll surface. The binder thus affixed to the calendering roll is increased in its bonding strength to the roll and in thickness as time elapses because the calendering roll is maintained at a higher temperature and at an elevated pressure. Should calendering be continued without attending to such condition, the surface of the magnetic layer becomes rough due to the presence of lumps of the binder. As a result, dropout results in the produced magnetic tape and hence satisfactory recording/reproduction can not be achieved.

The conventional practice in removing the foreign substance, such as the binder, thus affixed to the calendering roll surface, has been to use a cleaning tape which is kept in sliding contact with the calendering roll to remove the binder from the roll surface.

However, if only the cleaning tape is slidingly contacted with the calendering roll surface, the binder or the like foreign substance which has become affixed to the calendering roll surface cannot be removed reliably. Hence, it has been necessary to interrupt the calendering operation at an interval of one to two hours to wipe the foreign matter off from the calendering roll surface by a manual operation.

In this manner, in the conventional calendering operation, one is obliged to discontinue the operation to wipe the calendering roll surface manually, so that the operating rate cannot be raised, while the magnetic tape cannot be improved in quality.

OBJECTS AND SUMMARY OF THE INVENTION

It is therefore an object of the present invention to provide a calendering roll apparatus whereby the foreign substance, such as the binder, which has become attached to the calendering roll surface, may be wiped off reliably.

It is another object of the present invention to provide a calendering roll cleaning apparatus whereby the operating rate of the calendering operation and the magnetic tape quality may be improved significantly.

It is a further object of the present invention to provide a cleaning tape whereby the foreign substance affixed to the calendering roll surface, such as the binder, may be wiped off reliably.

In accordance with the present invention, there is provided a calendering roll cleaning apparatus comprising a cleaning tape for wiping the roll surface of the calendering roll and an elastic belt formed of an elastic material, wherein the cleaning tape is thrust from the rear side thereof by said elastic belt into pressure contact with the cleaning roll.

In accordance with the present invention, there is also provided a cleaning tape employed in a cleaning apparatus for a calendering roll, said cleaning tape being formed by a fibrous substrate formed by a main fiber material and an auxiliary fiber material, said fibrous substrate having a porosity corresponding to 10 to 50 $cc/cm^2/sec$ as measured by an air permeability test, and an abrasive affixed to the surface of said substrate in accordance with a predetermined pattern.

With the calendering roll cleaning apparatus according to the present invention, the cleaning tape is thrust into pressure abutment by an elastic belt with a surface region of the calendering roll opposite to the surface region of the roll about which the magnetic recording medium is wrapped, that is, from the back side of the roll, resulting in an improved wiping effect by the cleaning tape and positive wiping. The result is that the calendering operation may be continued for an extended period of time without interruptions and the operating rate and productivity may be improved.

On the other hand, since the cleaning tape employed in the calendering roll cleaning apparatus of the present invention is mainly constituted by a fibrous porous base material or substrate and an abrasive affixed on the surface of the base material in a predetermined pattern, the foreign matter affixed to the calendering roll surface, such as binder debris, may be scraped off by the abrasive, and the binder debris thus scraped off may be captured in the pores or voids.

In addition, since the cleaning tape of the present invention is formed by a fibrous base material composed of cellulose fibers as the main fiber material and rayon as the auxiliary fiber material, the tape has a smooth surface and a superior tensile strength. Thus, when thrust by the elastic belt into pressure contact with the calendering roll surface, the cleaning tape may have a uniform and homogeneous contact with the calendering roll without possibly injuring the roll surface.

DESCRIPTION OF THE PREFERRED EMBODIMENT

By referring to the accompanying drawings, an illustrative embodiment of the present invention will be explained in detail.

Figure 1:
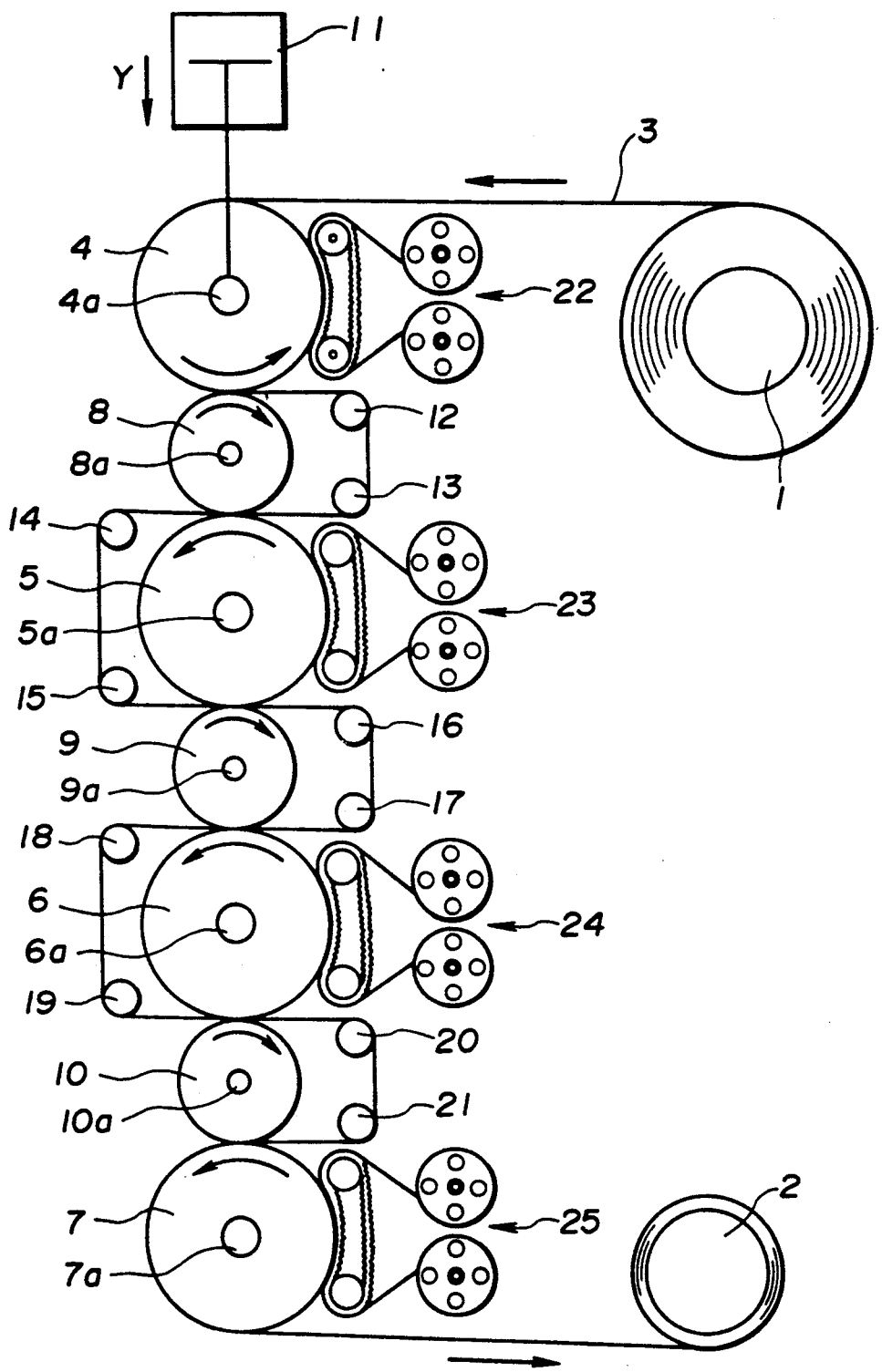
FIG. 1 is a side elevation showing the entire calendering apparatus.

Before proceeding to the description of the present calender roll cleaning apparatus, a calendering apparatus in which the present calender roll cleaning apparatus is employed is explained by referring to FIG. 1.

Referring to FIG. 1, the calendering apparatus is constituted by plural calender rolls 4, 5, 6 and 7, provided in the middle of a travel passage of a magnetic recording medium 3 travelling from a payout roll 1 to a take-up roll 2, and plural elastic rolls 8, 9 and 10 provided between adjoining ones of the calendering rolls 4, 5, 6 and 7. These calendering rolls 4, 5, 6 and 7 and elastic rolls 8, 9 and 10 are alternately arranged in tandem, with their surfaces in proximity to the neighboring roll surface and with their central axes 4a, 5a, 6a and 7a; 8a, 9a and 10a extending parallel to one another. In other words, the elastic rolls 8, 9 and 10 are arranged between the calendering rolls 4, 5, 6 and 7 arranged in tandem at a predetermined distance from one another so that the surfaces of the elastic rolls are situated in proximity to the surfaces of the calendering rolls.

The calendering rolls 4, 5, 6 and 7 are formed of stainless steel as cylinders, the roll surfaces of which are ground to a smooth mirror finish free of irregularities for producing the smooth surface of the magnetic layer of the magnetic recording medium. On the other hand, the elastic rolls 8, 9 and 10 are formed as cylinders of a slightly smaller outer diameter than the calendering rolls 4, 5, 6 and 7 and are formed of an elastic material. The roll surfaces of these elastic rolls 8, 9 and 10 are also formed as highly smooth surfaces free of irregularities. Above all, the roll surfaces of the calendering rolls are maintained at a higher temperature for easily producing the smooth surfaces of the magnetic layer.

The calendering rolls 4, 5, 6 and 7 and the elastic rolls 8, 9 and 10 may be rotated about their axes 4a, 5a, 6a, 7a; 8a, 9a and 10a, as the centers of rotation, in the directions shown by arrow marks in FIG. 1, and the magnetic recording medium 3 is adapted to travel between the calendering rolls 4, 5, 6 and 7 and the elastic rolls 8, 9 and 10 which are arranged in proximity to one another. A thrusting unit 11, such as a hydraulic cylinder, adapted for thrusting a central shaft at the axis 4a of the first calendering roll 4 as viewed in the realing out direction of the magnetic recording medium 3 in the direction shown by an arrow Y in FIG. 1, is adapted to apply a predetermined pressure to the magnetic recording medium 3 travelling between the calendering rolls and the elastic rolls.

The thrusting unit 11 is designed to apply a pressure to the central shaft at the axis 4a of the calendering roll 4 in the direction shown by an arrow Y in FIG. 1, so that the pressure is transmitted sequentially to the calendering rolls 4, 5, 6 and 7 and the elastic rolls 8, 9 and 10 for bringing the calendering rolls 4, 5, 6 and 7 into intimate contact with the elastic rolls 8, 9 and 10. In this manner, a predetermined pressure is applied to the magnetic recording medium 3 travelling between the calendering rolls 4, 5, 6 and 7 and the elastic rolls 8, 9 and 10. It is noted that the elastic rolls 8, 9 and 10, formed of an elastic material, are contacted under pressure with a certain contact surface area with the surface of the calendering rolls 4, 5, 6 and 7 to assure pressure contact of the magnetic recording medium 3 with the calendering rolls 4, 5, 6 and 7.

Meanwhile, the calendering apparatus is also provided with plural guide rolls 12, 13, . . . , 20, 21 for guiding the magnetic recording medium 3 between the calendering rolls 4, 5, 6 and 7 and the elastic rolls 8, 9 and 10 and for assuring stable running of the magnetic recording medium 3.

With the above calender roll cleaning apparatus, the magnetic recording medium 3 is reeled out from the payout roll 1 so as to travel along the surface of the uppermost calendering roll 4 in FIG. 1 and between this calendering roll 4 and the elastic roll 8 adjoining thereto before being led out by means the guide rolls 12 and 13. The magnetic recording medium 3 then travels between this elastic roll 8 and the calendering roll 5, placed therebelow in FIG. 1 so as to be led out by means of the guide rolls 14 and 15. The magnetic recording medium 3 is then guided between the calendering rolls 5, 6 and 7 and the elastic rolls 9 and 10 before being ultimately taken up by the take-up roll 2.

The calendering roll cleaning devices 22, 23, 24 and 25 according to the present invention are provided at the sides of the calendering rolls 4, 5, 6 and 7 opposite to the sides around which the magnetic recording medium 3 is wrapped partially. That is, the calendering roll cleaning devices 22, 23, 24 and 25 are provided in opposition to the magnetic recording medium 3, wrapped partially around the calendering rolls 4, 5, 6 and 7, with respect to the calendering rolls. Since these calendering rolls are of the same construction, the following description is made of one 22 of these rolls as an illustrative example.

Figure 2:
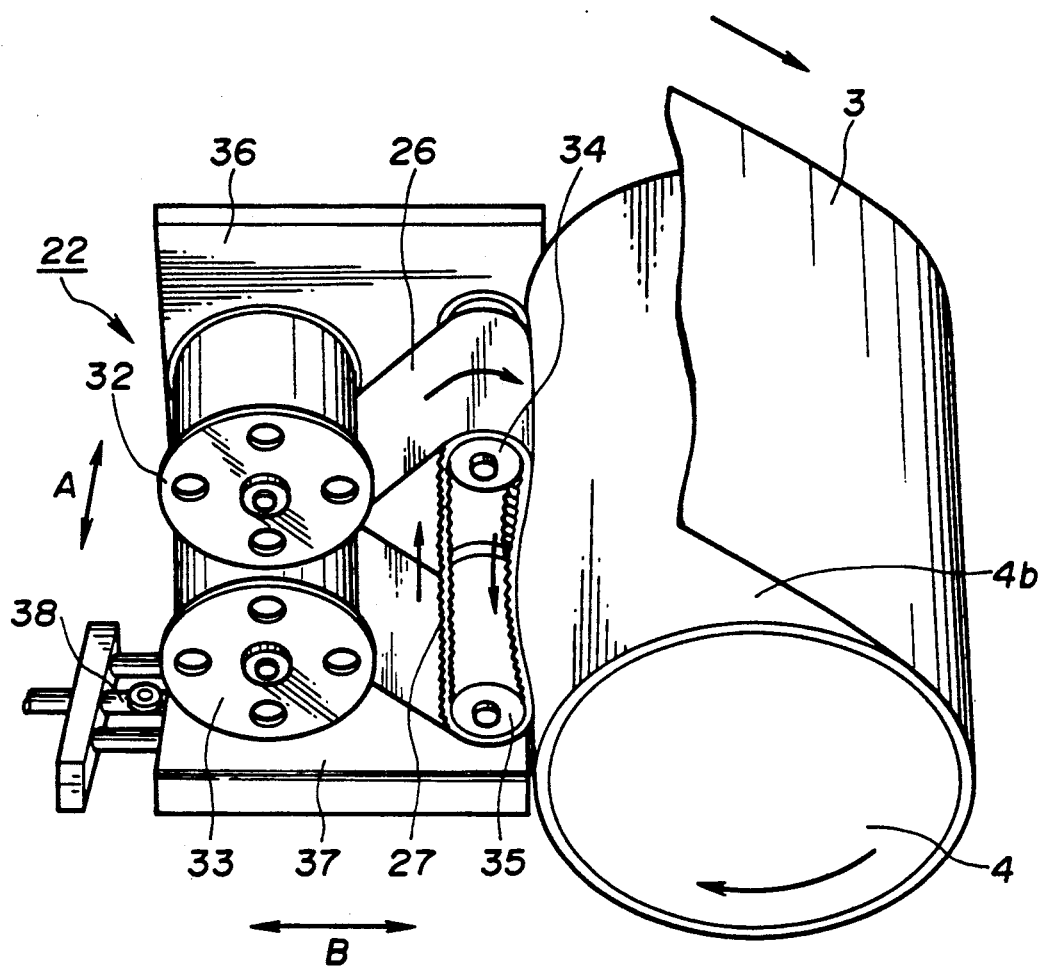
FIG. 2 is a perspective view showing a calendering roll cleaning apparatus.

Referring to FIG. 2, the calendering roll cleaning device 22 is constituted by a cleaning tape 26 for mainly wiping off the foreign matter, such as dust and dirt, which have become affixed to the surface 4b of the calendering roll 4, a cleaning tape running mechanism for running the cleaning tape 26 in sliding contact with the surface 4b of the calendering roll 4, and a resilient belt 27 for pressing the cleaning tape 26 into contact with the surface 4b of the calendering roll 4 from the back side of the roll with respect to the tape 26.

The cleaning tape 26 is adapted for removing dust and dirt, such as binder, which has become dislodged from the magnetic recording medium 3 wrapped around the surface 4b of the calendering roll 4, and which has become affixed to the surface 4b of the calendering roll 4. It is therefore desirable that the cleaning tape 26 be formed of such a material that is capable of positively wiping off the dust and dirt from the calendering roll 4 without injuring the surface 4b of the calendering roll 4 while being capable of capturing the wiped dust and dirt so that these do not become affixed again to the magnetic recording medium 3.

Figure 3:
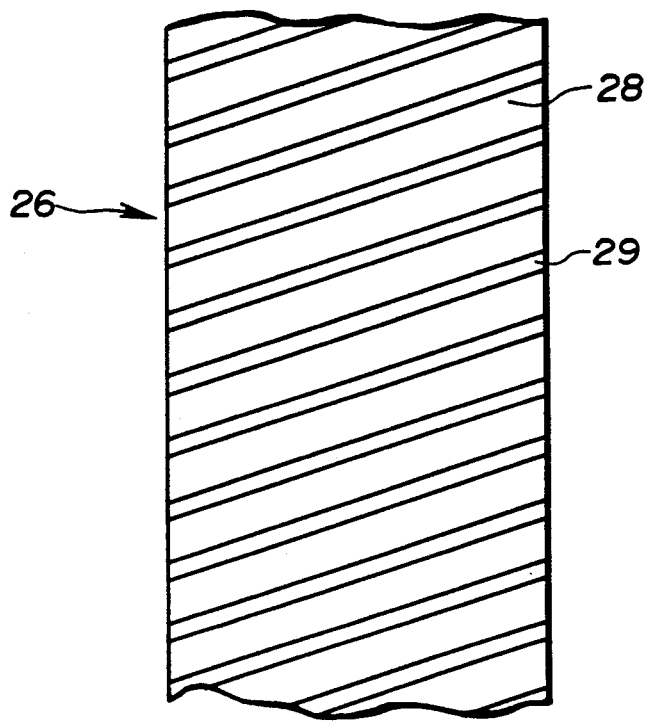
FIG. 3 is a plan view of a cleaning tape.
Figure 4:
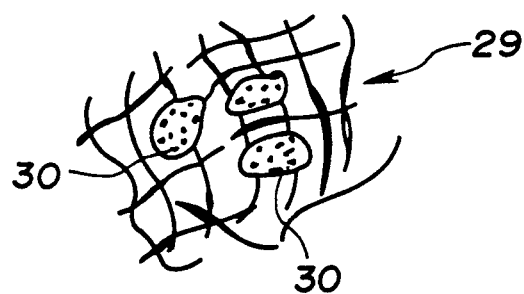
FIG. 4 is a schematic partial view of an abrasive layer formed on the cleaning tape, shown by an enlarged scale.

The cleaning tape 26 satisfying the above requirements is shown for example in FIG. 3 and constituted mainly by a fibrous substrate 28 and a number of abrasive layers 29 containing an abrasive kneaded with, for example, a binder and formed in a predetermined pattern on the surface of the substrate 28. The fibrous substrate 28 is formed by cellulose fibers as the main fibrous material and rayon as the auxiliary fibrous material and has a porosity corresponding to 10 to 50 cc/cm$^2$/sec as measured by a test on air permeability (Flajir type, JIS L1004 and L1018).

The main fibrous material and the auxiliary fibrous material are fibers with the thickness of 3 to 70 μm which are oriented regularly or randomly and bonded together with a binder for improving the bonding strength of the contact points of the neighboring fibers. The cellulose fibers are used as the main fiber material in order to prevent the surface 4b of the calendering roll 4 from being injured and to enable capturing of the dust and dirt which have become affixed to the surface 4b of the calendering roll 4. On the other hand, the rayon fibers are used as the auxiliary fiber material for preventing rupturing of the cleaning tape 26 by improving the tensile strength of the fibrous base material 28, in view that the cleaning tape 26 is brought into pressure contact with the calendering roll 4 by means of a resilient belt, as will be explained subsequently.

In the present illustrative embodiment, natural pulp fibers having a fiber thickness of 20 to 50 μm and a fiber length of 2 to 5 mm are used as the main fiber material, and rayon fibers having a fiber thickness of 17 μm and a fiber length of 5 mm are used as the auxiliary fiber material. These pulp and rayon fibers are bound together by a binder (VPB 101, commercially available as VINYLOM from the Kuraray Co., Ltd.) in an amount of 5 to 15 wt. % to provide the fibrous base material or substrate 28 which is 0.01 to 0.5 mm thick and has a porosity corresponding to 10 to 50 $cc/cm^2/sec$ as measured in an air permeability test (Flajir type; JIS L1004 and L1018). The fibrous material 28, obtained in this manner, has a high tensile strength, despite its reduced thickness, suffers from less fiber falling off, has a smooth surface and exhibits thermal resistance up to about 120° C. In addition, the fibrous substrate 28 has a higher porosity of 10 to 50 $cc/cm^2/sec$, as measured in the air permeability test, so that it is capable of positively capturing the dust and dirt which have become affixed to the surface 4b of the calendering roll 4 in the voids between the neighboring fibers as well as to prevent reattachment of the dust and dirt to the surface of the magnetic layer.

The abrasive layer 29 is constituted of a binder and a fine abrasive material, capable of positively grinding off the dust and dirt, such as the binder, which has become affixed to the surface 4b of the calendering roll 4b, without injuring the surface 4b of the calendering roll 4, and is formed in a regular repetitive bias pattern formed on the surface of the tape-shaped fiber base material 28, such as by printing, as shown in FIG. 3. The width and/or the interval of the repetitive bias patterns of the grinder layer 29 may be selected so that the dust and dirt which have become affixed to the surface 4b of the calendering roll 4 may be positively removed and the dust and dirt thus removed may be taken into the voids or pores of the fibrous base material in the regions thereof defined between the adjoining abrasive layers 29. These abrasive layers 29 may be formed as discrete repetitive bias patterns or regular repetitive patterns in the form of a lattice or the like.

Figure 5:
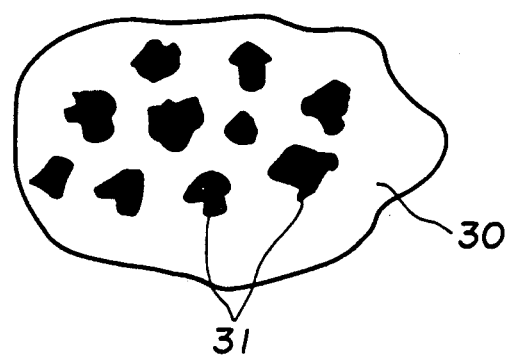
FIG. 5 is a schematic partial view of the abrasive layer of FIG. 4, shown by a further enlarged scale.
Figure 6:
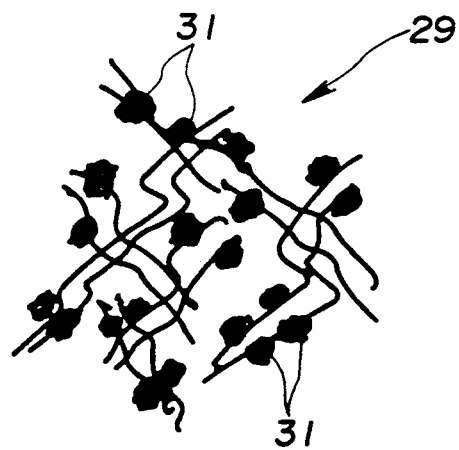
FIG. 6 is a schematic partial view of an abrasive layer applied by an alternative method, shown by an enlarged scale.

In the present embodiment, the abrasive layer 29 is not applied as a continuous layer on the surface of the substrate 28 but applied in the form of a number of localized spots or lumps of the binder 30 and an abrasive 31 is adapted to rest in dots of a smaller size on each lump of the binder 30, as shown in FIG. 5. Since the cellulose or rayon fibers are exposed in the areas of the layers 29 other than those occupied by the lumps of the binder 30, the dust and dirt ground off from the surface 4b of the calendering roll 4 may be positively captured by the pores or voids between the fibers. Besides, the abrasive may be bonded to the fibrous base material 28 with a higher bonding strength even if the binder 30 is of a somewhat inferior binding strength.

Alternatively, the abrasive material 31 and the binder 30 may also be applied to a smaller thickness by pattern coating on the surface of the fiber base material 28, provided that the binder holding the abrasive material 31 has a higher affinity with respect to the fibers. In the thus formed abrasive layer 29, the abrasive material 31 is affixed in the form of particles to the fiber surface, that is, to the periphery of the individual fibers. Therefore, if the surface 4b of the calendering roll 4 is wiped with the cleaning tape 26 having the abrasive layer 29, there is no localized excessive peak of pressure contact of the abrasive material 31, such that soft contact of mainly the fibrous base material 28 with the magnetic recording tape surface may be achieved with the least risk of an injury of the surface 4b of the calendering roll 4. The abrasive material 31 may also be applied uniformly on the fibrous base material 28.

Since the cleaning tape 26 is adapted for being reciprocated parallel to the roll axis along the surface of the calendering roll 4, the width of the cleaning tape 26 is selected to be smaller than the width of the cylindrical surface of the calendering roll 4.

The tape running mechanism is constituted by a pair of rotatable tape reels 32 and 33, about which the cleaning tape 26 is wrapped, and a pair of belt-driving rolls 34 and 35 for taking out the cleaning tape 26 from the tape reels 32 and 33 towards the calendering roll 4.

The tape reels 32 and 33 are each provided with a hub about which the cleaning tape 26 is wrapped, and a pair of flanges at the upper and lower ends of the hub for delimiting the end edges of the cleaning tape 26. The tape reels 32 and 33 are rotatably mounted on the ends of driving shafts, not shown, provided in the vicinity of a lateral edge of a base block 36 in the form of a flat plate, at a distance from each other, so as to be rotated in unison with these driving shafts.

It is noted that the end of the cleaning tape 26 wrapped on one of the tape reels 32 and 33, herein take-up reel 32, is provided with a tape quantity detection mechanism, not shown, for detecting the take-up quantity of the cleaning tape on the tape reel 32. Thus, when the cleaning tape 26 has become depleted, the tape quantity detection mechanism comes into operation to notify the user of the necessity of renewing the cleaning tape 26.

On the other hand, the belt-driving rolls 34 and 35 are rotatably mounted on the distal ends of driving shafts, not shown, provided at some distance from each other on the base block 36 in proximity to the other lateral edge of the base block 36, that is, in proximity to the periphery of the calendering roll 4. Thus, with the tape running mechanism, constituted by the tape reels 32 and 33 and the belt-driving rolls 34 and 35, the cleaning tape is led out from the tape reel 32 to the belt-driving roll 34 and into sliding contact with the surface 4b of the calendering roll 4 so as to be then led to the other belt-driving roll 35 before being ultimately taken up on the other tape reel 33. In this manner, the calender roll 4 is kept in sliding contact at all times with the new contact surface of the cleaning tape 26.

An elastic belt 27 is extended across the belt-driving rolls 34 and 35 for thrusting the cleaning tape 26 running between the belt-driving rolls 34 and 35 into pressure contact with the surface 4b of the calendering roll 4. The belt 27 is driven into rotation by the belt-driving rolls 34 and 35 simultaneously with the belt-driving rolls 34 and 35. Since the function of the elastic belt 27 is to thrust the cleaning tape 26 into pressure contact with the surface 4b of the calendering roll 4 for positively removing the dust and dirt which have become affixed to the calendering roll 4, it is formed of an elastic material, such as silicon rubber urethane rubber on NBR. Since the calendering roll 4 is maintained at a higher temperature of 60° to 120° C., the elastic belt 27 is preferably of an A hardness as measured in a JIS spring type hardness test (JIS K6301) of 40° to 90° so that the belt 27 is not softened at least at this temperature. The belt 27 may also be formed of urethane rubber if the calendering roll 4 operates at a lower temperature.

Figure 7:
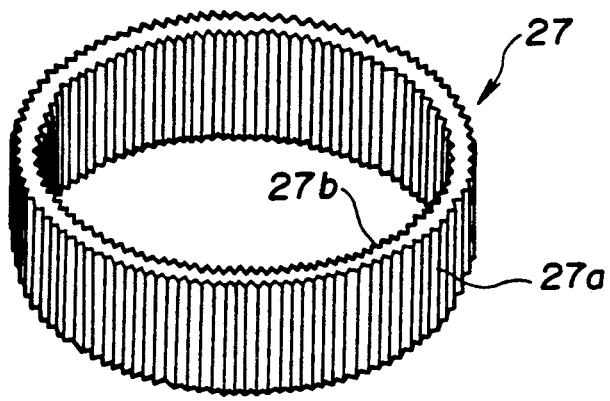
FIG. 7 is a perspective view of an elastic belt.
Figure 8:
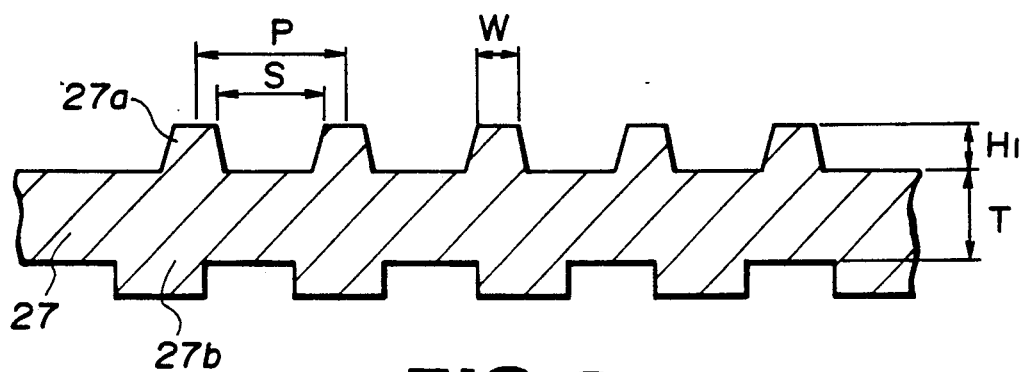
FIG. 8 is an enlarged cross-sectional view of the elastic belt.
Figure 9:
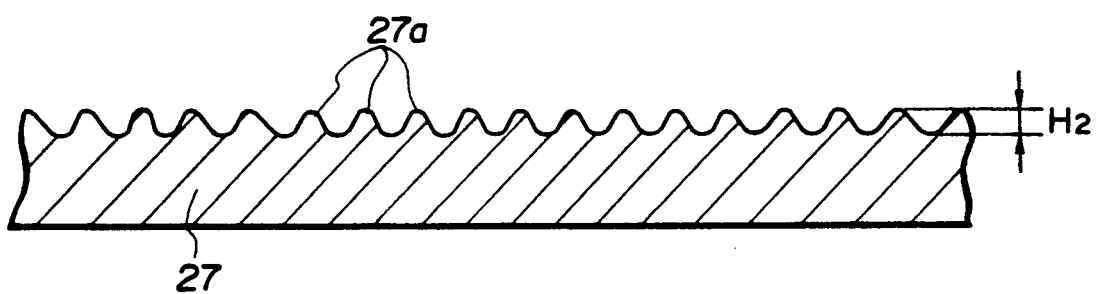
FIG. 9 is an enlarged cross-sectional view of a modified elastic belt.

The elastic belt 27 is provided with roughened or irregular surfaces, as shown in FIG. 7. The surface of the elastic belt 27 facing the cleaning tape 26 is formed with a multiplicity of ribs 27a for assuring pressure contact of the cleaning tape with the calendering roll 4. Referring to FIG. 8, these ribs are extended along the width of the belt 27 at a predetermined pitch on its entire outer and inner surfaces, and are rectangular in cross-section. with the thickness T of the elastic belt 27 of 1.5 to 3 mm, each rib 27a has a width W of 0.5 to 3.0 mm, a height $H_1$ of 0.5 to three times the width W and a pitch P of 3 to 5 mm, with an interval S between the neighboring ribs 27a being of the order of 0.3 to 3.0 mm. The ribs 27a may be extended obliquely with respect to the belt width or corrugated in a random manner, as shown in FIG. 9. In the latter case, the rib 27a is preferably of a height of approximately 10 $\mu$m or higher On the other hand, the ribs 27b formed on the inner surface of the elastic belt 27 facing the belt-driving rolls 34 and 35 are provided for driving the elastic belt 27, and are similarly formed at a predetermined pitch on the entire belt periphery as the ribs of substantially rectangular cross-section extending along the width of the elastic belt 27.

The above described calendering roll cleaning device 22 is adapted for being reciprocated by a hydraulic cylinder, not shown, parallel to the axis of the calendering roll 4 along the surface 4b of the calendering roll 4 as indicated by an arrow A in FIG. 2. Thus the entire peripheral surface of the calendering roll 4 may be wiped by the calendering roll cleaning device 22.

The calendering roll cleaning device 22 may also be moved in a direction shown by an arrow B in FIG. 2, that is, in a direction normal to the axis of the calendering roll 4. Thus the base block 36 of the calendering roll cleaning device 22, which is provided with the tape reels 32 and 33, is mounted on a slide plate 37 which is disposed at a right angle with respect to the base block 36, so that the cleaning device 22 may be moved in a direction normal to the axis of the calendering roll 4 by a hydraulic cylinder 38 provided on the slide plate 37. In this manner, the pressing state of the cleaning tape 26 against the calendering roll 4 during travel of the cleaning tape 26 between the belt-driving rolls 34 and 35 may be freely changed by the reciprocating operation of the hydraulic cylinder 38 provided on the slider plate 37. That is, a piston rod, not shown, of the cylinder 38 may be extended outwards to a variable degree for establishing a more or less strong intimate contact of the cleaning tape 26 with the roll surface.

The calendering operation by the calendering apparatus, provided with the above described calendering roll cleaning devices 22, 23, 24 and 25, may be performed in the following manner.

The magnetic recording medium 3, having its magnetic layer processed by magnetic orientation, is placed about the payout roll 1, and reeled out so as to be placed around the calendering rolls 4 to 7, elastic rolls 8 to 10 and a tape running system constituted by the guide rolls 12 to 21 and wrapped fixedly around the take-up roll 2.

The magnetic recording medium 3 is run from the payout roll 1 onto the take-up roll 2.

A predetermined pressure is then applied by the thrusting unit 11 on the magnetic recording medium 3 which is disposed between the calendering rolls 4 to 7 and the elastic rolls 8 to 10.

The cleaning tapes 26 of the calendering roll cleaning devices 22 to 25 are then thrust into pressure contact with the surfaces of the calendering rolls 4 to 7 and run in sliding contact with the calendering roll surfaces.

As a result, the surfaces of the magnetic layer on the magnetic recording medium 3 may be smoothened under the pressure between the calendering rolls 4 to 7. The dust and dirt, such as the binder, which has become dislodged in the course of the calendering process from the magnetic layer so as to be attached to the surfaces of the calendering rolls 4 to 7, are wiped off by the cleaning tape 26 for maintaining perpetually clean roll surfaces. Above all, the cleaning tape 26 is brought into close pressure contact with the surfaces of the calendering rolls 4 to 7 by the elastic belt 27 so that the dust and dirt which has become attached to the surfaces of the calendering rolls 4 to 7 is positively scraped off by the ribs 27a formed on the belt 27. The foreign matter wiped off from the calendering rolls 4 to 7 is captured by the voids in the cleaning tape 26 mainly composed of the fibrous base material 28 without becoming reattached to the magnetic recording medium 3.

Thus, with the use of the calendering roll cleaning devices 22 to 25 and the cleaning tapes 26 of the present illustrative embodiment, processing may be carried out for an extended period of time with improved operating rate and improved productivity. Also the magnetic recording medium 3 processed in this manner, is free of irregularities on its magnetic layer and of extremely high quality.

The present invention is not limited to the above described embodiment of the calendering roll cleaning apparatus and the cleaning tapes, but may comprise various modifications.

For example, although the cleaning tape 26 in the above described embodiment has a width narrower than the roll length of the calendering rolls 4 to 7, and is reciprocated parallel to the roll axis along the calender roll surfaces to wipe the entire surfaces of the calendering rolls, the cleaning tape 26 may be of a width at least equal to the roll length of the calendering rolls 4 to 7, and the cleaning tapes 26 may be fixed, without being reciprocated, for simplifying the construction of the cleaning apparatus.

Figure 10:
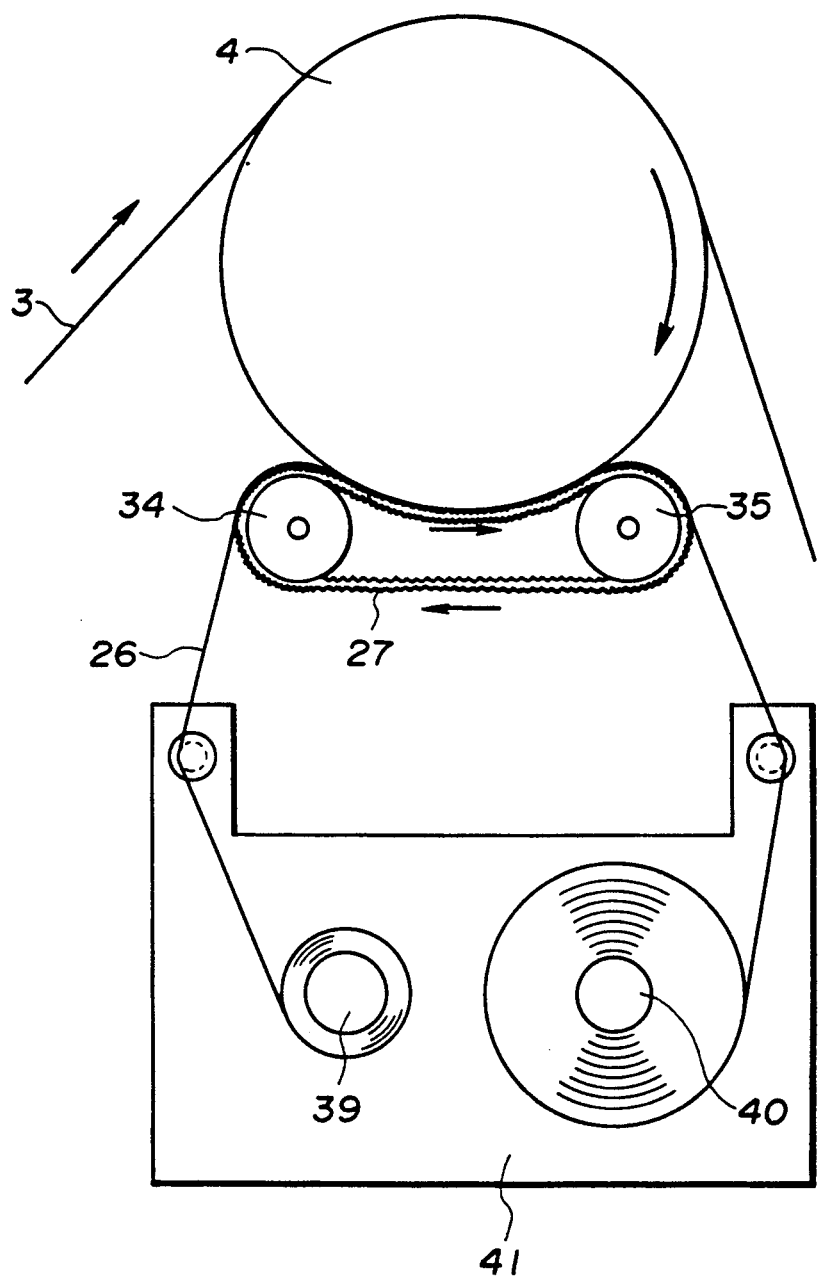
FIG. 10 is a side view of a cleaning tape accommodated in a cassette.

The cleaning tape 26 may be accomodated in a cassette 41 having a pair of reel shafts 39 and 40, as shown in FIG. 10, the cassette 41 being set on the base block 36 to which the tape reels 32 and 33 are attached and the reel shaft 39 and 40 being engaged with the driving shafts adapted for rotationally driving the tape reels 32 and 33. This facilitates handling of the cleaning tape 26 to improve the operability significantly.

What is claimed is:

1. A cleaning apparatus for cleaning the surface of a calendering roll comprising
    a cleaning tape for wiping off foreign matter which has become affixed to the surface of the calendering roll, a cleaning tape running mechanism for running the cleaning tape in sliding contact with the surface of the calendering roll, and a elastic belt for pressing the cleaning tape into contact with the surface of the calendering roll,
   wherein at least the surface of said elastic belt facing said cleaning tape is roughened, and said elastic belt has an A hardness as measured by the spring type hardness test of JIS K6301 as 40° to 90°.

2. The calendering roll cleaning apparatus according to claim 1 wherein said elastic belt is formed of silicon rubber.

3. The calendering roll cleaning apparatus according to claim 1, wherein said cleaning tape is formed by a fibrous substrate having a surface, said fibrous substrate being formed by main fiber material and an auxiliary fiber material and having a porosity corresponding to 10 to 50 cc/cm$^2$/sec as measured by an air permeability test of the Flajir type, JIS L1004 and L1018, and an abrasive affixed to said surface of said substrate in accordance with a predetermined pattern.

4. The calendering roll cleaning apparatus according to claim 3 wherein said main fiber material is cellulose fibers and said auxiliary fiber material is rayon.

5. The calendering roll cleaning apparatus according to claim 3 wherein said main and auxiliary fiber materials are of a fiber thickness of 3 to 70 $\mu$m and said fibrous substrate is of a thickness of 0.01 to 0.5 mm.

* * * * *